United States Patent

McLauchlan

(10) Patent No.: US 9,810,310 B2
(45) Date of Patent: Nov. 7, 2017

(54) MULTI-COMPONENT FLUID DISTRIBUTION SYSTEM

(71) Applicant: EATON CORPORATION, Cleveland, OH (US)

(72) Inventor: Raymond Bruce McLauchlan, Macomb Township, MI (US)

(73) Assignee: Eaton Corporation, Cleveland, OH (US)

( * ) Notice: Subject to any disclaimer, the term of this patent is extended or adjusted under 35 U.S.C. 154(b) by 140 days.

(21) Appl. No.: 14/680,764

(22) Filed: Apr. 7, 2015

(65) Prior Publication Data

US 2015/0285368 A1    Oct. 8, 2015

Related U.S. Application Data

(60) Provisional application No. 61/976,103, filed on Apr. 7, 2014, provisional application No. 61/984,122, filed on Apr. 25, 2014, provisional application No. 62/004,947, filed on May 30, 2014, provisional application No. 62/029,591, filed on Jul. 28, 2014.

(51) Int. Cl.
*F16H 57/04*    (2010.01)

(52) U.S. Cl.
CPC ....... *F16H 57/0421* (2013.01); *F16H 57/046* (2013.01)

(58) Field of Classification Search
CPC .................. F16H 57/0421; F16H 57/046
USPC ........................................ 184/6.12; 285/364
See application file for complete search history.

(56) References Cited

U.S. PATENT DOCUMENTS

| | | | |
|---|---|---|---|
| 3,359,351 A | 12/1967 | Bender | |
| 3,738,452 A * | 6/1973 | Hausinger | F16H 57/0421 184/6.12 |
| 4,049,480 A | 9/1977 | Kutschke | |
| 4,485,057 A | 11/1984 | Kristensson et al. | |
| 5,299,657 A * | 4/1994 | Hikes | F16N 7/40 184/104.1 |
| 7,007,716 B2 * | 3/2006 | Smahl | F16L 23/04 137/561 A |
| 7,040,454 B2 * | 5/2006 | Kawamoto | F01M 1/02 123/196 R |

(Continued)

FOREIGN PATENT DOCUMENTS

GB    1525551 A    9/1978

OTHER PUBLICATIONS

International Search Report and Written Opinion for corresponding application No. PCT/US2015/024693, dated Jun. 23, 2015.

*Primary Examiner* — William E Dondero
*Assistant Examiner* — Mark K Buse
(74) *Attorney, Agent, or Firm* — RMCK Law Group PLC

(57) ABSTRACT

A multi-component fluid distribution system includes a first substrate component having an inlet for receiving fluid and an internal channel for communicating lubricant. A second substrate component is interlocked to the first substrate component. The second substrate component includes an inlet to receive fluid from the first component. The fluid distribution system also includes an over-molded portion sealing a joint between the first and second substrate components. The fluid distribution system further includes at least one outlet nozzle connected to the second substrate component to discharge fluid to a predetermined fluid receiving component.

6 Claims, 4 Drawing Sheets

(56) References Cited

U.S. PATENT DOCUMENTS

| | | | |
|---|---|---|---|
| 7,172,054 B2* | 2/2007 | Ruther | F01M 1/08 |
| | | | 184/26 |
| 2006/0052202 A1 | 3/2006 | Morgensai | |
| 2006/0076193 A1* | 4/2006 | Ruther | F01M 1/08 |
| | | | 184/6.12 |
| 2006/0152003 A1* | 7/2006 | Slunick | F16L 13/00 |
| | | | 285/364 |
| 2010/0018807 A1* | 1/2010 | Grenfeldt | F16H 57/0456 |
| | | | 184/6.12 |
| 2010/0212613 A1 | 8/2010 | Lemke et al. | |

* cited by examiner

MULTI-COMPONENT FLUID DISTRIBUTION SYSTEM

CROSS-REFERENCE TO RELATED APPLICATIONS

This application claims the benefit of U.S. provisional application Ser. Nos. 61/976,103 filed Apr. 7, 2014; 61/984,122 filed Apr. 25, 2014; 62/004,947 filed May 30, 2014; and 62/029,591 filed Jul. 28, 2014, the disclosures of which are hereby incorporated in their entirety by reference herein.

TECHNICAL FIELD

The present disclosure relates to lubricant distribution for traction components of a vehicle transmission.

BACKGROUND

Transmissions, such as vehicle transmissions, have one or more gear meshes that selectively transfer torque from an input shaft to an output shaft of the transmission. The gear meshes commonly require lubrication during transmission operation. The gear meshes and lubricant may be contained within a transmission case or housing, and an internal sump may be provided to collect drained fluid and act as a reservoir.

Lubrication distribution systems are used to circulate lubricant and provide a sufficient quantity of lubricant to the moving parts of the transmission. Several types of lubrication systems are used. For example, a system referred to as a splash system utilizes a splasher or dipper affixed to one or more of the moving traction parts within an internal cavity of the transmission case. The moving parts are cycled through lubricant within the sump during the movement of parts and lubricant is splashed about the internal cavity of the case. The splash may be diverted using internal features of the transmission such as veins or funnels that direct the flow of lubricant as it drains. Splash systems include a high volume of lubricant and may allow lubricant to slosh within the internal cavity. One problem with splash lubrication is that it is speed dependent. There can be centrifugal effects, hydrodynamic effects, and effects from the gears working as pumps that may reduce efficiency of the transmission.

Dry lubrication systems distribute lubricant differently compared to splash systems. In dry lubrication systems, a significantly smaller volume of lubricant is contained in a sump within the transmission. The lubricant is drawn out of the sump and diverted to the traction components as required. An arrangement of tubes may be used to diverting lubricant to specific locations within the transmission. The arrangement may be complex, and the tubes may be steel tubes that are formed, then brazed or welded to separate nozzles. With metal tube structures, implementing a large number of nozzles presents design and manufacturing challenges. The metal tubes may require unique custom shapes to deliver lubricant to desired locations. The assembly of a large number of customized parts is often expensive and may require complex tooling.

This disclosure is directed to solving the above problem and other problems as summarized below.

SUMMARY

In at least one embodiment, a multi-component fluid distribution system includes a first substrate component having an inlet for receiving fluid and an internal channel for communicating lubricant. A second substrate component is interlocked to the first substrate component. The second substrate component includes an inlet to receive fluid from the first component. The fluid distribution system also includes an over-molded portion sealing a joint between the first and second substrate components. The fluid distribution system further includes at least one outlet nozzle connected to the second substrate component to discharge fluid to a predetermined fluid receiving component.

In at least one embodiment, a lubrication distribution system includes a plurality of hollow substrate components connected in fluid flow series and receiving lubricant from an inlet. The lubrication distribution system also includes a plurality of nozzles disposed along the substrate components in fluid communication with the inlet, the plurality of nozzles being positioned to discharge lubricant to targeted traction components within a transmission. The lubrication distribution system further includes an over-molded portion formed about a connection between two adjacent substrate components.

In at least one embodiment, a transmission fluid distribution system includes a first hollow component having a first end in fluid communication with an inlet and a second end for discharging fluid. The fluid distribution system also includes a second hollow component having a first end in fluid communication with the second end of the first hollow component and a nozzle for discharging fluid to a targeted fluid receiving component. The fluid distribution system further includes an over-molded portion sealing at least one of an interface between the first and the second hollow components, and an interface between the second hollow component and a nozzle.

The above aspects of this disclosure and other aspects are described below in greater detail with reference to the attached drawings.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
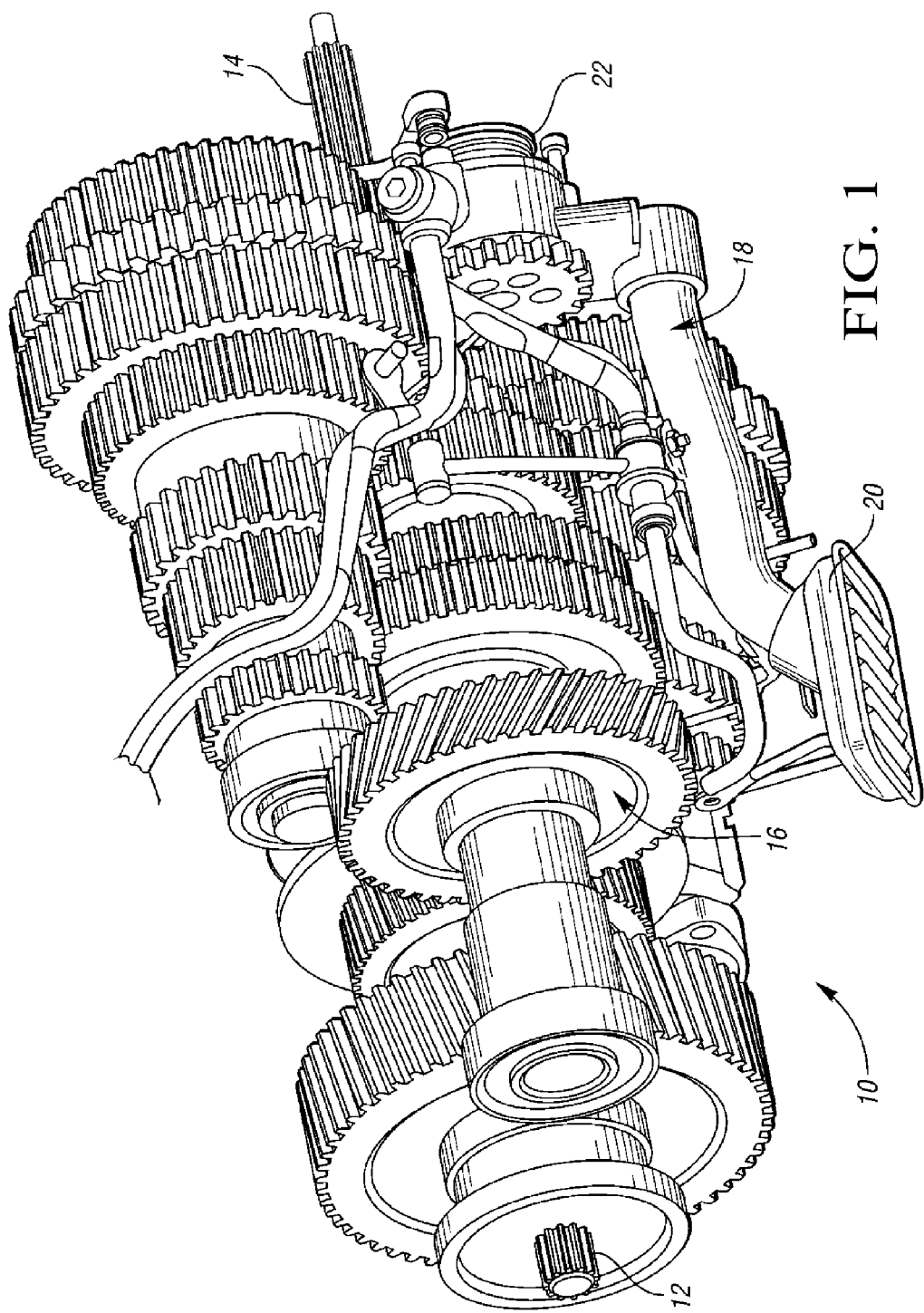
FIG. 1 is a perspective view of transmission internal components.

FIG. 1 depicts a lubrication system schematic of a transmission 10. The arrangement of driveline components is provided as an example, but may vary depending on the application. The transmission 10 includes an outer housing, or case, defining an internal cavity to contain the internal components of the transmission 10. The case is not shown to provide better visibility of the internal components. The case may be made from one or more castings, forgings, or other parts.

The transmission 10 receives input torque from an engine connection 12, and delivers output torque at a driveline connection 14. The transmission includes a gear train 16 having a plurality of traction components that are adjustable to vary the ratios of both the speed and the torque of the output relative to the input. For example, the gear train 16 may comprise meshed gears and/or planetary gear sets. The transmission 10 may also be connected to an auxiliary transmission (not shown) to provide a wider ratio adjustment. The internal working components of the transmission 10 require sufficient lubrication to maintain efficient operation, reduce drag, and prevent excessive heat build-up.

According to an aspect of the present disclosure, a dry sump lubrication system 18 is used to efficiently distribute transmission lubricant through the transmission 10. The dry sump configuration reduces drag losses caused by lubricant splash associated with a higher lubricant volume splash lubrication system. The fluid distribution system 18 within the transmission is used to distribute the fluid lubricant from the sump. More efficient operation of the transmission 10 is achieved by distributing fluid lubricant directly to transmission traction components. Active distribution of the fluid reduces the overall volume required to attain sufficient lubrication. The fluid distribution system 18 is pressure driven and includes a strainer 20 and a pump 22. The pump 22 creates pressure and draws lubricant from the sump. A filter may be positioned near the intake of the pump 22 to restrict foreign particles from being cycled through the lubrication system. The fluid distribution system 18 also may include a pressure regulator near an exhaust port of the pump 22 that opens when pressure in the system attains a predetermined value, for example, in the case of the filter clogging. Lubricant is forced through a supply tube by the pump 22. The supply tube is in fluid flow communication with an arrangement of fluid distribution tubes that direct lubricant to targeted locations within the transmission. In at least one embodiment, the supply tube serves as a fluid inlet for the fluid distribution system.

Figure 2:
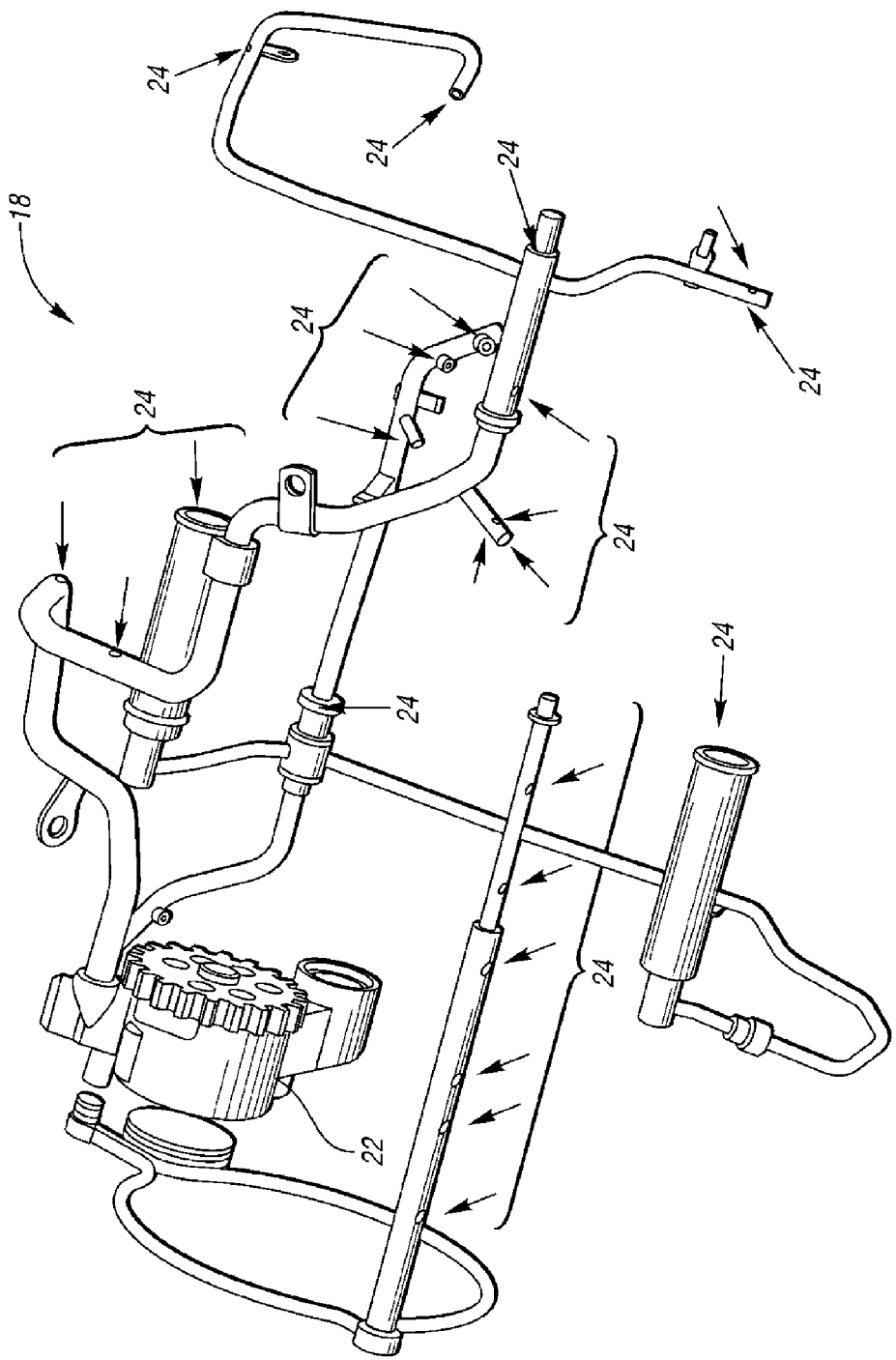
FIG. 2 is a perspective view of a fluid distribution system.

Referring to FIG. 2, the fluid distribution system 18 is shown with other transmission components removed. The fluid distribution system 18 comprises a number of generally elongate members, each defining an internal channel. The elongate members may be joined to each other directly, or by intermediate connecting members. Based on the relative placement of the individual traction components within the transmission 10, each of a plurality of outlet ports 24 are positioned at spaced locations along the length of the elongate members of the fluid distribution system 18 to direct fluid to a predetermined fluid receiving component. Outlet ports 24 may also be positioned to distribute fluid from the intermediate connecting members. Certain of the outlet ports 24 may comprise orifices in a sidewall of an elongate portion to expel fluid. Others of the of outlet ports 24 may comprise at least one outlet nozzle protruding laterally from an elongate portion for directing fluid to targeted locations. Where an intermediate connecting member includes a lateral protrusion outlet nozzle, the connector may be a tee connection component. There are a number of fluid target output locations according to the respective positions of various driveline components of the transmission.

The various outlet ports 24 may also provide different fluid output types including stream spray patterns and fan spray patterns. The outlet ports 24 may define a simple orifice that directs fluid exiting the fluid distribution system 18 in a solid stream spray pattern. Alternatively, the outlet ports 24 may have an elongate orifice that directs the lubricant exiting the fluid distribution system 18 in a fan spray pattern to provide a wider lubricant coverage area. Hollow cone spray patterns, mist sprays, solid cone spray patterns, and/or asymmetric variants of the above patterns may also be suitable to reach targeted fluid receiving components of the transmission 10. The plurality of ports may include a combination of different orifice types to output each of a solid stream spray pattern and a fan spray pattern. The dimensions of each orifice may be selected to obtain a desirable output pressure of the fluid stream based on the volume flow through the fluid distribution system 18. For example, a mist fan spray pattern may be more suitable to target a synchronizer traction component of the transmission 10 that requires broad coverage lubrication. A solid stream pattern may be more suitably targeted to specific locations along gear mesh traction components within the transmission 10.

According to an aspect of the present disclosure, a multi-component arrangement is provided to distribute lubricant. An assembly of smaller components is assembled to create a customized fluid distribution system having a geometry that corresponds to locations of targeted components requiring lubrication. Also, smaller sub-components allow for greater variation in wall thickness across the assembly as compared to a unitary arrangement. Each segment may have local variations in wall thickness and internal channel diameters to impose predetermined parameters on the fluid flow such as changing pressure and velocity at different portions of the fluid distribution system as desired. Components having higher resiliency can be positioned at high pressure or high stress areas.

Figure 3:
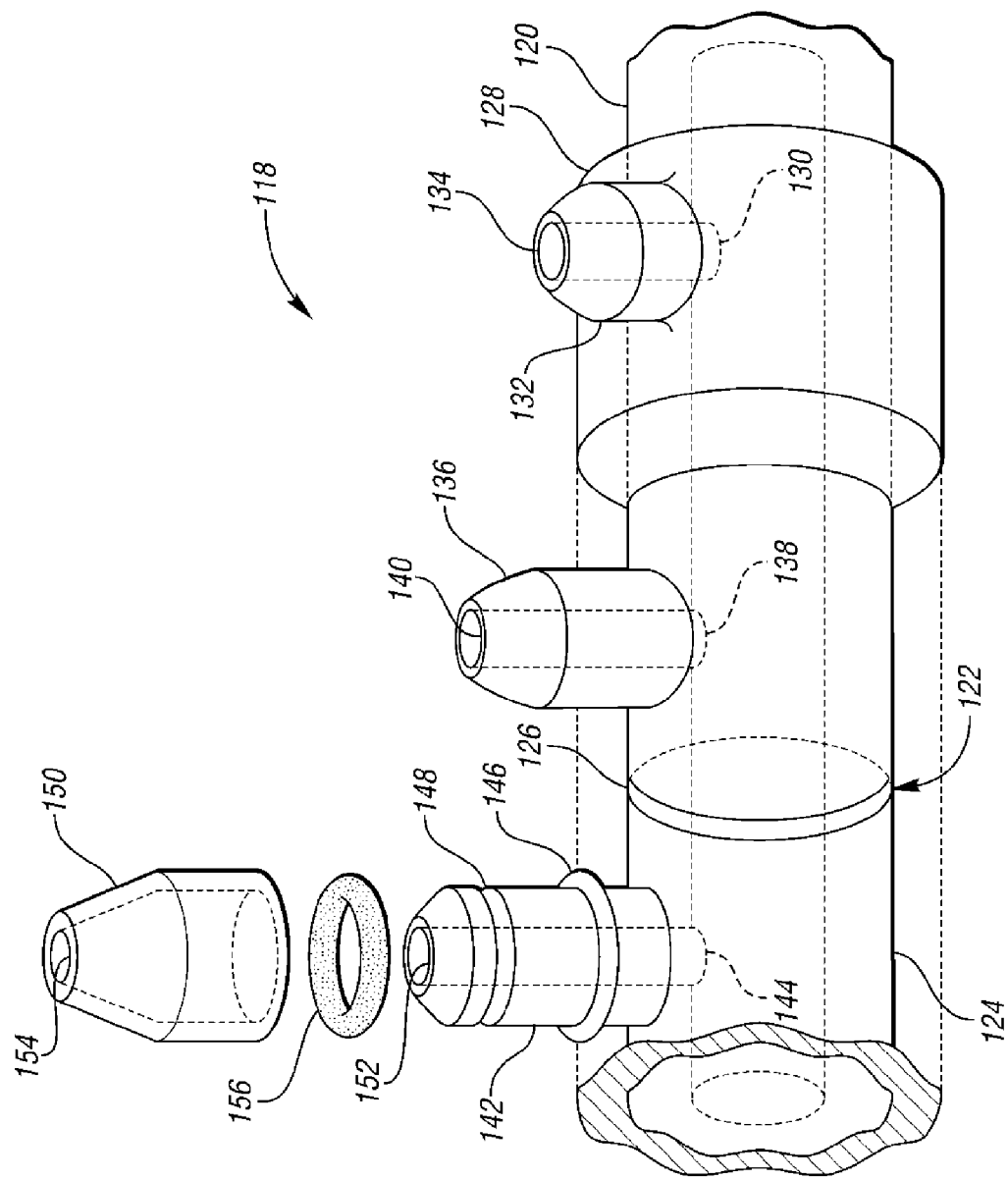
FIG. 3 is a fragmentary view of a portion of a fluid distribution system.

Referring to FIG. 3, a fragmentary portion of a fluid distribution system 118 is shown. A number of connecting components is assembled to create the desired geometry and fluid output locations. Each of the components may be small components relative to the overall size of the fluid distribution system 118. By utilizing smaller components, more intricate features may be provided locally to each sub-component of the fluid distribution system 118. As a result, an assembly having complex output locations and various fluid output patterns may be achieved with reduced overall tooling costs.

A first hollow substrate component 120 is depicted having a connection end 122 to interlock to an adjacent second hollow substrate component 124. The first hollow substrate component 120 is connected to the second hollow substrate component 124 in fluid flow series. The connection between the first and the second hollow substrate components 120, 124 may be a press fit arrangement where the connection end 122 is inserted into an opening of the second hollow substrate component 124. In some embodiments, an elastomeric o-ring is provided to enhance fluid sealing of a joint 126 between two adjacent components. In other embodiments, the second hollow substrate component 124 is press fit to the first hollow substrate component 120 over an annular ring.

An over-molded portion 128 is formed about an exterior portion of the first hollow substrate component 120. In at least one embodiment, the over-molded portion 128 is formed by injection molding material about one or more substrate portions. The left portion of the FIG. 3 depicts the over-molded portion 128 in phantom as dotted lines to show the underlying features of the first and the second hollow substrate components 120, 124. The over-molded portion 128 may be sized to correspond to a particular local feature, or the over-molding may encompass large global areas of the fluid distribution system 118.

Still referring to FIG. 3, the over-molded portion 128 is formed about a connection between two adjacent substrate components. The over-molded portion 128 fluidly seals the joint 126 between the first hollow substrate component 120 and a second hollow substrate component 124. The added material can enhance sealing performance, particularly against fluid pressure increases near the joint 126. The over-molded material also increases the mechanical retention strength between the adjacent substrate components.

The over-molded portion 128 is formed about an orifice 130 in the first hollow substrate component 120. A first outlet nozzle 132 may be integrally formed by the over-mold material. A retractable pin may be inserted into orifice 130 during molding to create a fluid communication path between orifice 130 and an outlet orifice 134. In the example provided in FIG. 3, a stream spray nozzle is depicted having a round orifice.

A second outlet nozzle 136 is a separate component that is inserted into a molding cavity against an orifice 138 of the first hollow substrate component 120 prior to the formation of the over-molded portion 128. Then the over-molded portion 128 may be formed about both of the first hollow substrate component 120 and the second outlet nozzle 136 such that an outlet orifice 140 is in fluid communication with the orifice 138 of the first hollow substrate component 120. The separate component facilitates selection of differently shaped and sized outlet orifices 140 depending on desired fluid flow parameters.

A third outlet nozzle 142 is also a separate component that is inserted against an orifice 144 within a mold cavity similar to the second outlet nozzle describe immediately above. The third outlet nozzle 142 may include one or more retention features. An annular protrusion 146 may be included such that the over-molded portion 128 traps the protrusion and increases mechanical retention. Although an annular protrusion is described by way of example, other geometric features can be provided on a separate outlet nozzle to enhance mechanical retention within the over-molded material.

An annular detent 148 may also be included on the third outlet nozzle 142 to retain a separate nozzle cap 150 that is assembled following the over-molding process. The nozzle cap 150 is attached to a terminal end of the third outlet nozzle 142. A generic outlet orifice 152 may be provided at a distal end of the third outlet nozzle 142 that is in fluid communication with the orifice 144 of the second hollow substrate component 124. A secondary outlet orifice 154 on the nozzle cap 150 may be used to adjust flow pressure and/or output spray type. An O-ring 156 may also be disposed about the third outlet nozzle 142 to enhance sealing to the nozzle cap 150. The nozzle cap 150 is interchangeable, and may be conveniently detached and replaced when required, such as during service or repair. Serviceability is enhanced because individual nozzle tips may be replaced or reused as opposed to servicing an entire section of the fluid distribution system 118. Detachable nozzle tips provide several advantages, including customizable flow types as described above. Any of several types of interchangeable nozzle tips can be combined with the underlying nozzle to influence the spray type, or provide a closed tip to stop the fluid flow altogether. Further development and optimization of fluid distribution is enhanced as various nozzle tips may be employed during development to achieve desired lubrication levels.

Each type of nozzle provided in FIG. 3 may be employed either alone or in combination across various portions of the fluid distribution system 118.

Figure 4:
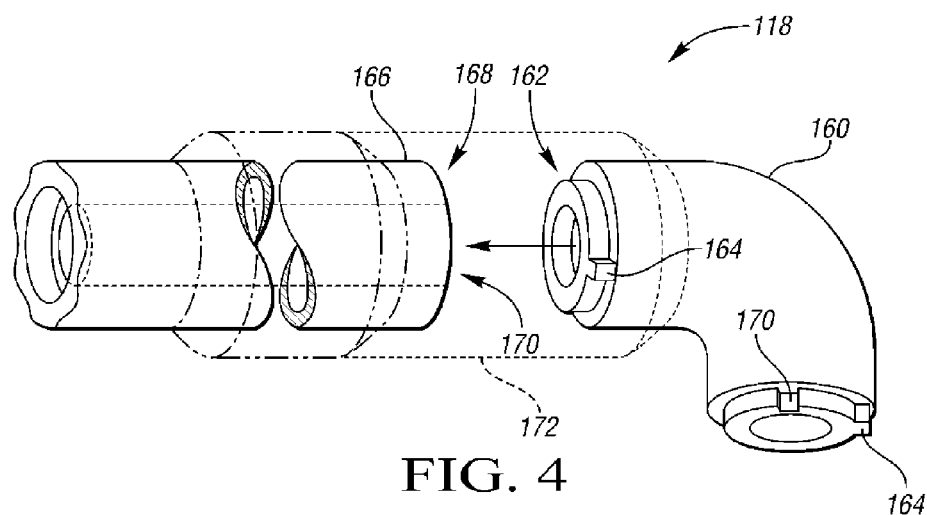
FIG. 4 is a fragmentary view of a portion of another embodiment fluid distribution system.

Referring to FIG. 4, another fragmentary portion of a fluid distribution system 118 is shown. An alignment feature may be provided to ensure alignment of adjacent components at a joint. A third hollow substrate component 160 includes an end portion 162. A protruding key portion 164 extends laterally from the end portion 162. A fourth hollow substrate component 166 includes and end portion 168 having a recessed keyway portion 170 that corresponds to the key portion 164. When the third hollow substrate component 160 is properly aligned with respect to the fourth hollow substrate component 166, the key portion 164 is inserted into the recessed keyway portion 170. When the components are misaligned, assembly is prevented thereby providing an error proofing mechanism to ensure a single angular alignment during assembly. An over-molded portion 172, represented by dotted lines in FIG. 4, may be formed about the outer portions of the third hollow substrate component 160 and the fourth hollow substrate component 166 to seal the joint between the components.

Figure 5A:
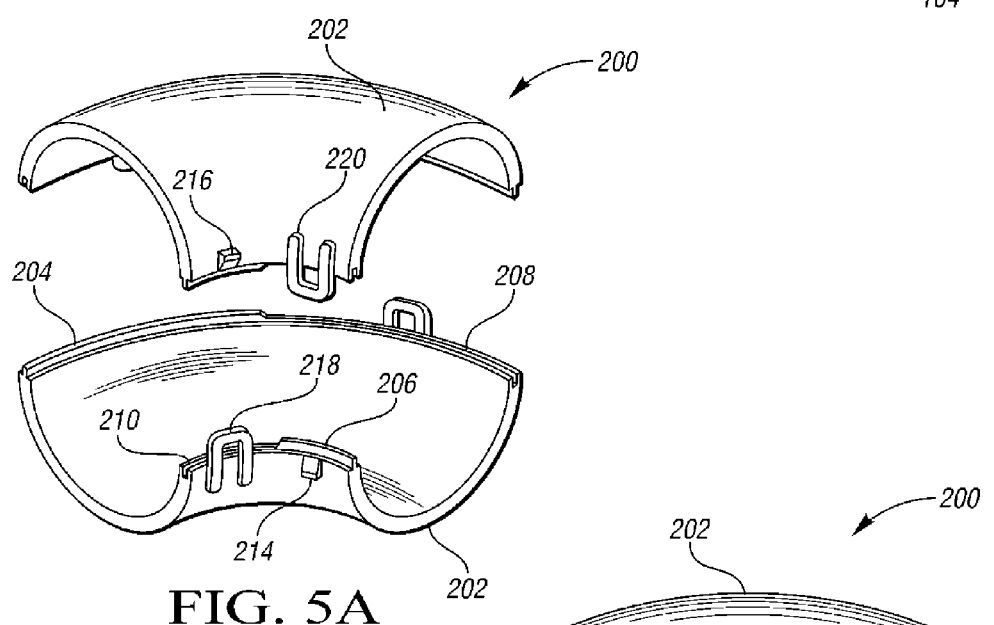
FIGS. 5A and 5B are perspective views of a multi-piece component of a fluid distribution system.
Figure 5B:
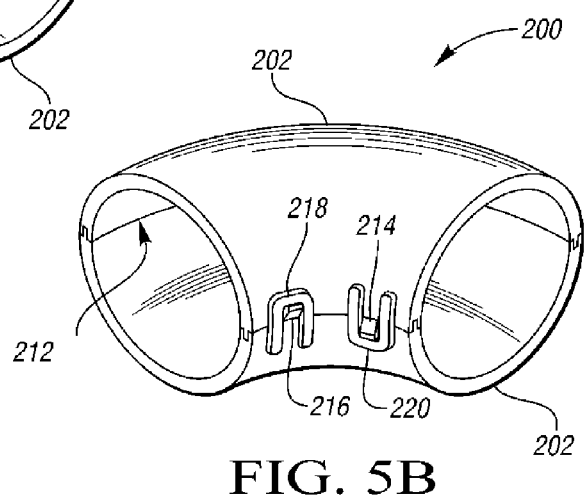

Referring to FIGS. 5A and 5B a two-piece substrate component 200 is shown. In at least one embodiment, substrate component 200 is formed by two symmetrical halves 202 shaped such that when they are reversed, two of the same components are capable of interlocking to each other. Once assembled, the substrate component 200 is formed by the pair of symmetrical halves interlocked to one another. Tongue portions 204, 206 are provided along an edge of each of the symmetrical halves 202. Likewise, corresponding groove portions 208, 210 are also formed along supplementary portions of each edge of the symmetrical halves 202. Once assembled, the tongue portions 204, 206 of one of the symmetrical halves 202 are inserted into a corresponding groove portions 208, 210 of the other of the symmetrical halves 202. The tongue-and-groove arrangement provides for a tortuous flow path during over-molding to prevent mold material from flowing through the seam 212 between the pair of symmetrical halves 202.

Retention features are also provided on each of the pair of symmetrical halves 202. Like other features of the two-piece arrangement, the retention features are symmetrically opposed such that the retention features align with, interlock to, each other when the symmetrical halves are positioned opposite from one another. In one example, the retention features comprise ramped barbs 214, 216 and cantilevered tabs 218, 220. When the components are assembled the cantilevered tabs 218, 220 are deflected over a ramped portion of the barbs 214, 216. Once fully inserted, the cantilevered tabs 218, 220 are cinched and retain to a flat portion of the barbs 214, 216. Although cantilevered tabs and ramped barbs are depicted, other retention mechanisms may also be suitable to retain opposing symmetrical halves to each other. In another embodiment arrowhead portions having deflecting prongs may cooperate with fixed openings to retain the symmetrical halves to each other. Once the arrowhead portions are fully inserted though the fixed openings on the opposing half, the prongs expand and prevent separation of the opposing symmetrical halves.

While the above embodiments are described in the context of a transmission lubrication system, it is envisioned that modular components may be assembled to obtain customized fluid distribution systems for other applications requiring fluid distribution to targeted locations. For example, the components described herein may be suitable for HVAC coolant circulation. Additionally, fuel applications such as may similarly benefit from the customizable fluid distribution arrangements described above.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lubrication distribution system comprising:
    a first hollow substrate component and a second hollow substrate component connected in series and receiving lubricant from an inlet;
    a plurality of nozzles disposed along the substrate components in fluid communication with the inlet, the plurality of nozzles positioned to discharge lubricant to targeted traction components within a transmission, a first nozzle of the plurality of nozzles comprising a separate component from the first and second hollow substrate components prior to formation of an over-molded portion; and
    an over-molded portion formed about (i) a connection between the first and second hollow substrate components, and (ii) the first nozzle, the over-molded portion creating a fluid seal between (i) the first and second hollow substrate components, and (ii) the first nozzle.

2. The lubrication distribution system of claim 1 wherein at least one of the first and second hollow substrate components comprises a tee connector having a first end to receive lubricant, an outlet to discharge lubricant to one of the plurality of nozzles, and a second end to communicate lubricant to another substrate component.

3. The lubrication distribution system of claim 1 wherein at least one of the plurality of nozzles is formed by over-mold material and extends laterally from an orifice in one of the first and second hollow substrate components.

4. The lubrication distribution system of claim 1 wherein each of the plurality of nozzles includes an outlet orifice arranged to discharge lubricant in a solid stream pattern or a fan spray pattern onto a traction component of the transmission.

5. The lubrication distribution system of claim 1 wherein the first nozzle comprises an annular protrusion and wherein the over-molded portion traps the annular protrusion and increases mechanical retention of the first nozzle.

6. The lubrication distribution system of claim 1, further comprising: a nozzle cap that is selectively attached to the first nozzle, wherein the first nozzle defines a first outlet orifice having a first dimension and the nozzle cap defines a second outlet orifice having a second dimension, the second dimension being smaller than the first dimension providing increased flow pressure of the discharged lubricant.

* * * * *